(12) United States Patent
Kubo et al.

(10) Patent No.: US 10,061,293 B2
(45) Date of Patent: Aug. 28, 2018

(54) BLADE HOLDER FOR CUTTING APPARATUS AND BLADE USE HISTORY STORAGE DEVICE

(71) Applicant: DISCO CORPORATION, Tokyo (JP)

(72) Inventors: Masahiro Kubo, Tokyo (JP); Fumio Uchida, Tokyo (JP); Yohei Yamada, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 358 days.

(21) Appl. No.: 14/860,194

(22) Filed: Sep. 21, 2015

(65) Prior Publication Data

US 2016/0091887 A1    Mar. 31, 2016

(30) Foreign Application Priority Data

Sep. 25, 2014  (JP) .................................. 2014-195169

(51) Int. Cl.
```
G06F 19/00      (2018.01)
G05B 19/402     (2006.01)
G05B 15/02      (2006.01)
```

(52) U.S. Cl.
CPC .......... *G05B 19/402* (2013.01); *G05B 15/02* (2013.01); *G05B 2219/35527* (2013.01); *G05B 2219/49074* (2013.01)

(58) Field of Classification Search
CPC .............................. G05B 19/402; G05B 15/02
USPC ....................................................... 700/114
See application file for complete search history.

(56) References Cited

U.S. PATENT DOCUMENTS

| | | | | |
|---|---|---|---|---|
| 6,361,404 B1* | 3/2002 | Ishiwata | ................ | B28D 5/024 125/20 |
| 6,776,078 B2* | 8/2004 | Gawazawa | ............ | B28D 5/023 125/13.01 |
| 6,968,938 B2* | 11/2005 | Inoue | .................. | H01L 21/6838 198/468.4 |
| 7,279,403 B2* | 10/2007 | Nagai | ............... | H01L 21/67092 125/23.01 |
| 7,316,174 B2* | 1/2008 | Sekiya | ................... | B28D 5/024 125/13.01 |
| 7,459,655 B2* | 12/2008 | Nomaru | ............. | B23K 26/0853 219/121.74 |
| 2005/0224475 A1* | 10/2005 | Nomaru | ................. | B23K 26/03 219/121.82 |

(Continued)

FOREIGN PATENT DOCUMENTS

JP    2006-051596    2/2006

*Primary Examiner* — Jami M Valentine
(74) *Attorney, Agent, or Firm* — Greer Burns & Crain Ltd.

(57) ABSTRACT

A cutting apparatus including a cutting unit on which a cutting blade is detachably mounted, a control unit for controlling the cutting unit, and a blade case holder for holding a blade case for storing the cutting blade is provided. The blade case is provided with an IC tag allowing reading and writing of use history information of the cutting blade. The control unit is connected to a read/write unit for reading the use history information from the IC tag of the blade case held by the blade case holder and writing the use history information to the IC tag. The use history information read from the IC tag by the read/write unit is reflected in processing conditions for a workpiece to be processed, and the use history information after processing of the workpiece is written to the IC tag by the read/write unit.

3 Claims, 6 Drawing Sheets

(56) References Cited

U.S. PATENT DOCUMENTS

| | | | |
|---|---|---|---|
| 2006/0021896 A1* | 2/2006 | Cleathero | G11B 33/0444 206/454 |
| 2006/0270236 A1* | 11/2006 | Kusumoto | H01L 27/1214 438/692 |
| 2008/0098221 A1* | 4/2008 | Hashimoto | G06Q 20/3674 713/169 |

* cited by examiner

BLADE HOLDER FOR CUTTING APPARATUS AND BLADE USE HISTORY STORAGE DEVICE

BACKGROUND OF THE INVENTION

Field of the Invention

The present invention relates to a cutting apparatus for cutting a platelike workpiece.

Description of the Related Art

In dividing a platelike workpiece such as a semiconductor wafer into a plurality of chips, a cutting apparatus mounting an annular cutting blade therein is used, for example. The cutting blade is formed by mixing abrasive grains of diamond, CBN, etc. with a bonding material such as vitrified bond and resinoid bond. When the cutting blade is worn to some extent, it is discarded.

In a manufacturer or the like performing flexible manufacturing, there are many chances of exchanging the cutting blade according to the characteristics of the workpiece and there is also a case that the cutting blade still usable is demounted from the cutting apparatus. Usually, the cutting blade demounted from the cutting apparatus is stored in a blade case. In storing the cutting blade in the blade case, it is important to suitably manage the use history of the cutting blade for future use (reuse). In this respect, there has been proposed a cutting blade in which a wireless IC tag capable of storing information including the use history is embedded (see Japanese Patent Laid-open No. 2006-51596, for example).

SUMMARY OF THE INVENTION

However, such a cutting blade having a wireless IC tag has a problem that the wireless IC tag is apt to break in the process of manufacture, so that this cutting blade is not practical from the viewpoint of manufacturing cost or the like. Further, there is a case that the wireless IC tag may be broken due to vibration, shock, etc. in cutting the workpiece.

It is therefore an object of the present invention to provide a cutting apparatus which can manage the use history of a cutting blade easily and suitably.

In accordance with an aspect of the present invention, there is provided a cutting apparatus including a chuck table for holding a workpiece, a cutting blade for cutting the workpiece held on the chuck table, cutting means on which the cutting blade is detachably mounted, control means for controlling the cutting means according to processing conditions set for processing of the workpiece, and a blade case holder for holding a blade case for storing the cutting blade; the blade case being provided with an IC tag allowing reading and writing of use history information of the cutting blade; the cutting apparatus further including read/write means connected to the control means for reading the use history information of the cutting blade from the IC tag of the blade case held by the blade case holder and writing the use history information of the cutting blade to the IC tag; wherein the use history information of the cutting blade read from the IC tag by the read/write means is reflected in the processing conditions, and the use history information of the cutting blade after processing of the workpiece is written to the IC tag by the read/write means.

Preferably, the read/write means is provided on the blade case holder. As a modification, the read/write means is provided in an area opposed to the blade case holder.

As described above, the cutting apparatus includes the cutting means on which the cutting blade is detachably mounted, the control means for controlling the cutting means, and the blade case holder for holding the blade case for storing the cutting blade, wherein the control means is connected to the read/write means for reading the use history information of the cutting blade from the IC tag of the blade case held in the blade case holder and writing the use history information of the cutting blade to the IC tag. Accordingly, the use history information of the cutting blade read from the IC tag by using the read/write means can be reflected in the processing conditions for the workpiece to be processed. Further, the new use history information of the cutting blade after processing of the workpiece can be written to the IC tag by using the read/write means. As a result, the use history of the cutting blade can be managed easily and suitably.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
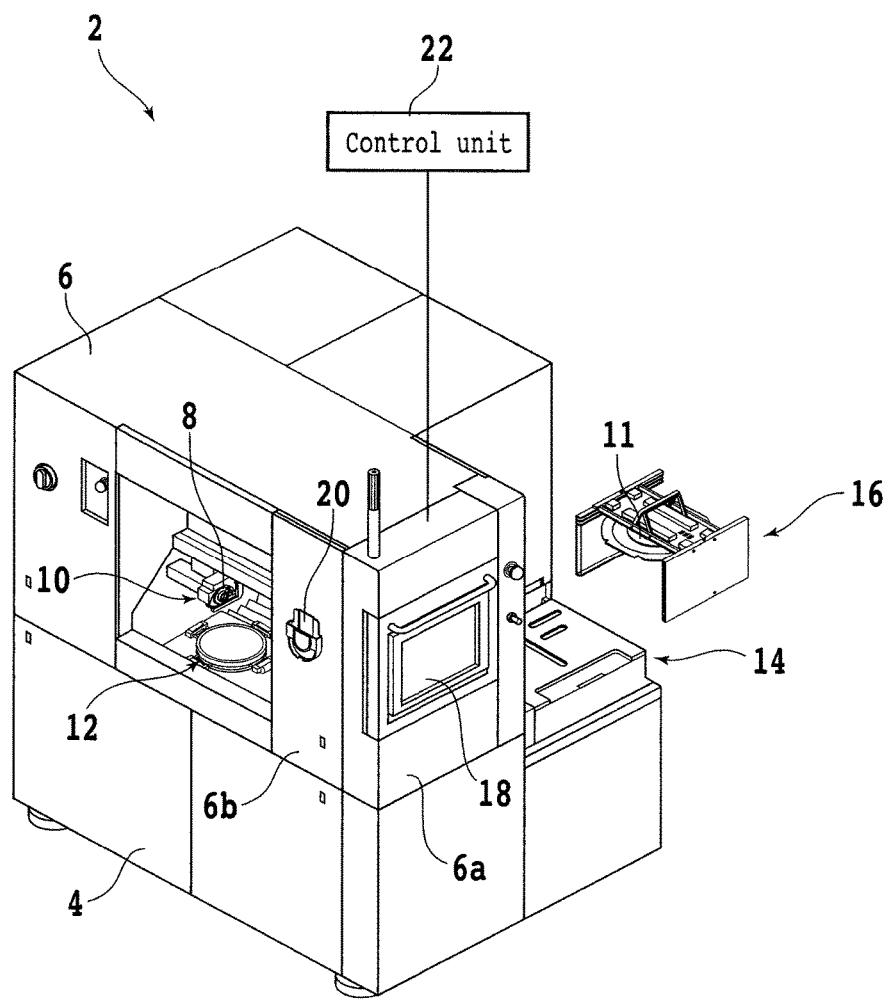
FIG. 1 is a schematic perspective view showing the configuration of a cutting apparatus according to a preferred embodiment of the present invention.

A preferred embodiment of the present invention will now be described with reference to the attached drawings. FIG. 1 is a schematic perspective view showing the configuration of a cutting apparatus 2 according to this preferred embodiment. As shown in FIG. 1, the cutting apparatus 2 includes a base 4 for supporting various components. A cover 6 is provided on the upper side of the base 4 to cover the base 4. A space is defined inside the cover 6 to accommodate a cutting unit (cutting means) 10 including a cutting blade 8. The cutting unit 10 is movable in a longitudinal direction (Y direction or indexing direction) by a cutting unit moving mechanism (not shown). A chuck table 12 for holding a workpiece 11 under suction is provided below the cutting unit 10. The chuck table 12 is movable in a lateral direction (X direction or feeding direction) by a chuck table moving mechanism (not shown) and also rotatable about a vertical axis (Z axis) by a rotating mechanism (not shown).

A cassette elevator 14 is provided at a front right corner portion of the base 4. A cassette 16 capable of storing a plurality of workpieces 11 is adapted to be placed on the upper surface of the cassette elevator 14. Each workpiece 11 is a circular platelike workpiece formed of silicon, sapphire, or resin, for example. The cassette elevator 14 is vertically movable to thereby adjust the position of the cassette 16 in a vertical direction (Z direction) so that each workpiece 11 can be taken out of and into the cassette 16.

The cover 6 has a front surface 6a, and a touch panel type monitor 18 as a user interface is provided on the front surface 6a of the cover 6. The cover 6 has a side surface 6b, and a blade case holder 20 is provided on the side surface 6b of the cover 6. The blade case holder 20 will be hereinafter described in detail. The monitor 18 is connected to a control unit (control means) 22 for controlling each component of the cutting apparatus 2. For example, the control unit 22 controls the operation of the cutting unit 10, the cutting unit moving mechanism, the chuck table 12, and the chuck table moving mechanism according to processing conditions set through the monitor 18.

Figure 2:
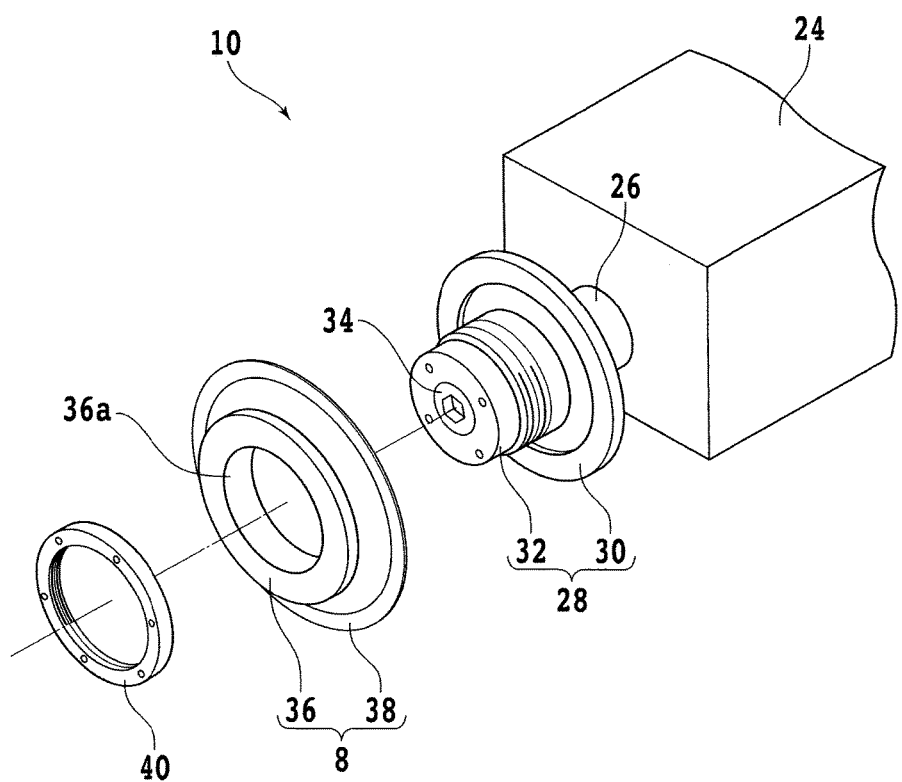
FIG. 2 is a schematic exploded perspective view showing the configuration of a cutting unit.

FIG. 2 is a schematic exploded perspective view showing the configuration of the cutting unit 10. In FIG. 2, a part of the components of the cutting unit 10 is omitted. As shown in FIG. 2, the cutting unit 10 includes a spindle housing 24 and a spindle 26 rotatably supported to the spindle housing 24. A flange 28 for fixing the cutting blade 8 is mounted on the front end portion of the spindle 26. The flange 28 is composed of a flange portion 30 projecting radially outward and a boss portion 32 axially projecting from the front side (front surface) of the flange portion 30. The back side (rear surface) of the flange portion 30 is formed with an engaging portion (not shown) for engaging the front end portion of the spindle 26. A bolt 34 is tightened in the condition where the front end portion of the spindle 26 is engaged with the engaging portion of the flange portion 30, thereby fixing the flange 28 to the spindle 26.

The cutting blade 8 is a so-called hub blade, which is composed of a disk-shaped support base 36 and an annular cutting edge 38 fixed to the outer circumference of the support base 36. The support base 36 has a central hole 36a for insertion of the boss portion 32 of the flange 28. By inserting the boss portion 32 through the central hole 36a of the support base 36, the cutting blade 8 is mounted on the flange 28. The cutting edge 38 is formed by mixing abrasive grains of diamond, CBN, etc. with a bonding material such as vitrified bond, resinoid bond, and metal bond (typically, nickel bond) and forming an annular shape. While such a hub blade is used as the cutting blade 8 in this preferred embodiment, a so-called washer blade consisting of only a cutting edge may be used. In the condition where the cutting blade 8 is mounted on the flange 28, an annular fixing ring 40 is mounted on the front end portion of the boss portion 32, so that the cutting blade 8 is fixedly held between the flange 28 and the fixing ring 40.

Figure 3:
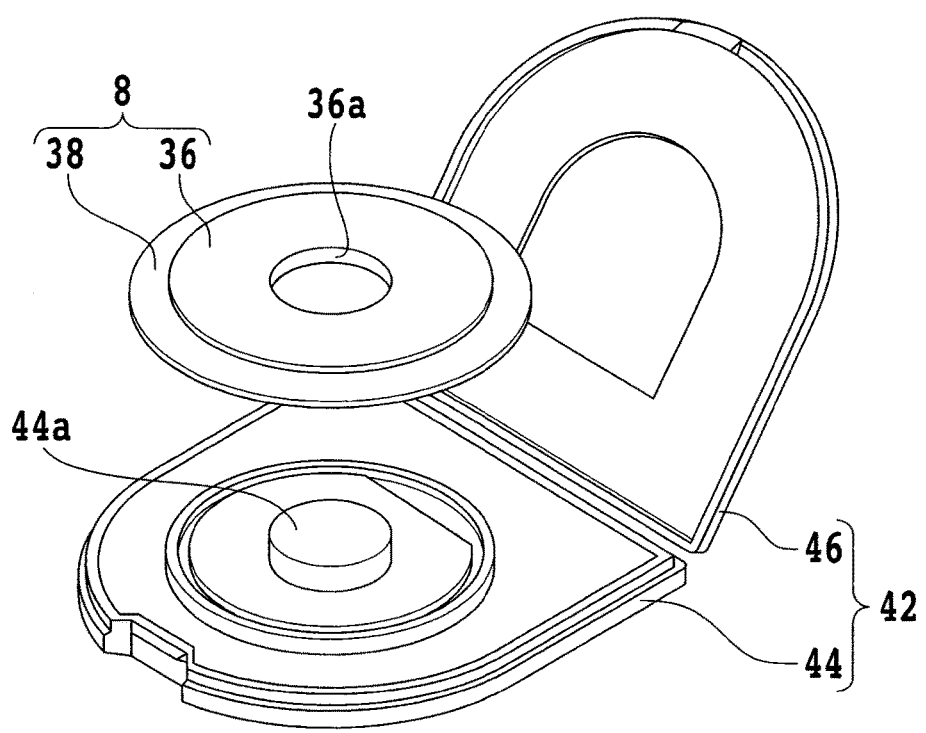
FIG. 3 is a schematic perspective view showing the configuration of a blade case.
Figure 4:
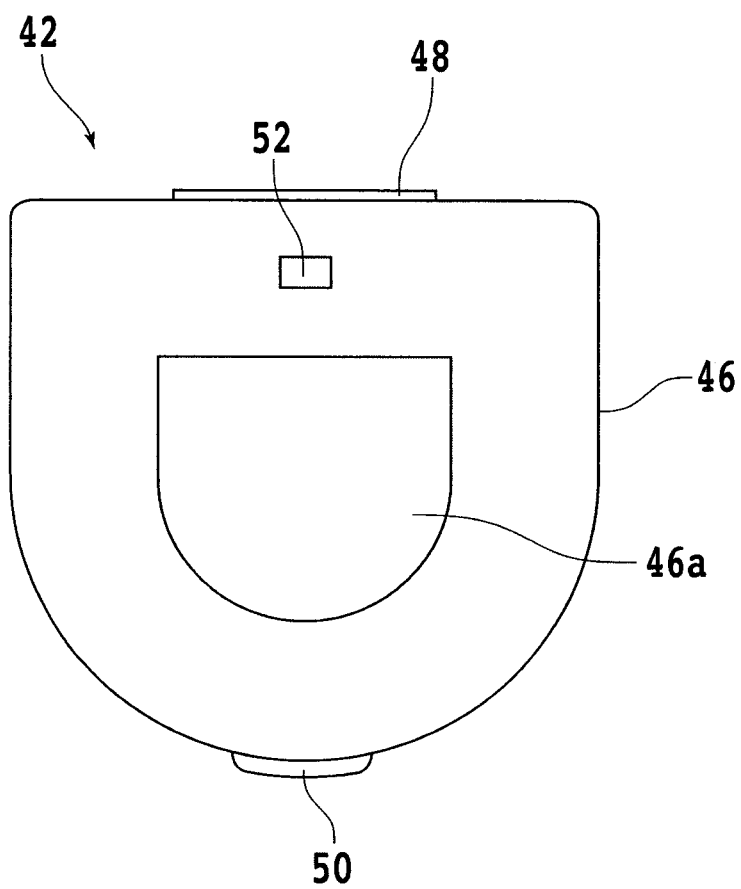
FIG. 4 is a schematic plan view of the blade case shown in FIG. 3.

FIG. 3 is a schematic perspective view showing the configuration of a blade case 42 for storing the cutting blade 8, and FIG. 4 is a schematic plan view of the blade case 42. As shown in FIG. 3, the blade case 42 includes a storing portion 44 for storing the cutting blade 8 and a lid portion 46 for preventing the cutting blade 8 stored in the storing portion 44 from dropping off. Each of the storing portion 44 and the lid portion 46 is a semi-rectangular platelike member having two arcuate corners adjacent to each other. One end of the storing portion 44 opposite to the other end where the arcuate corners are formed is connected through a connecting portion 48 (see FIG. 4) to one end of the lid portion 46 opposite to the other end where the arcuate corners are formed. The connecting portion 48 functions as a hinge for allowing the lid portion 46 to be opened and closed with respect to the storing portion 44. A lug portion 50 (see FIG. 4) for use in opening the lid portion 46 is formed on the other end of the lid portion 46 at a position opposite to the connecting portion 48. A solid cylindrical projection 44a is formed on the inner surface of the storing portion 44 opposed to the lid portion 46. This projection 44a is adapted to be inserted through the central hole 36a of the cutting blade 8. Accordingly, by inserting the projection 44a of the storing portion 44 through the central hole 36a of the cutting blade 8 and then closing the lid portion 46, the cutting blade 8 can be stored in the blade case 42.

As shown in FIG. 4, an IC tag 52 is provided on the outer surface of the lid portion 46 at a position near the connecting portion 48. The IC tag 52 functions to store use history information of the cutting blade 8 received in a noncontact manner (in a wireless manner) and also to transmit the use history information stored in a noncontact manner (in a wireless manner). As a modification, the IC tag 52 may be provided on the storing portion 44. The IC tag 52 is called also a wireless IC tag or an RFID tag, for example.

Figure 5:
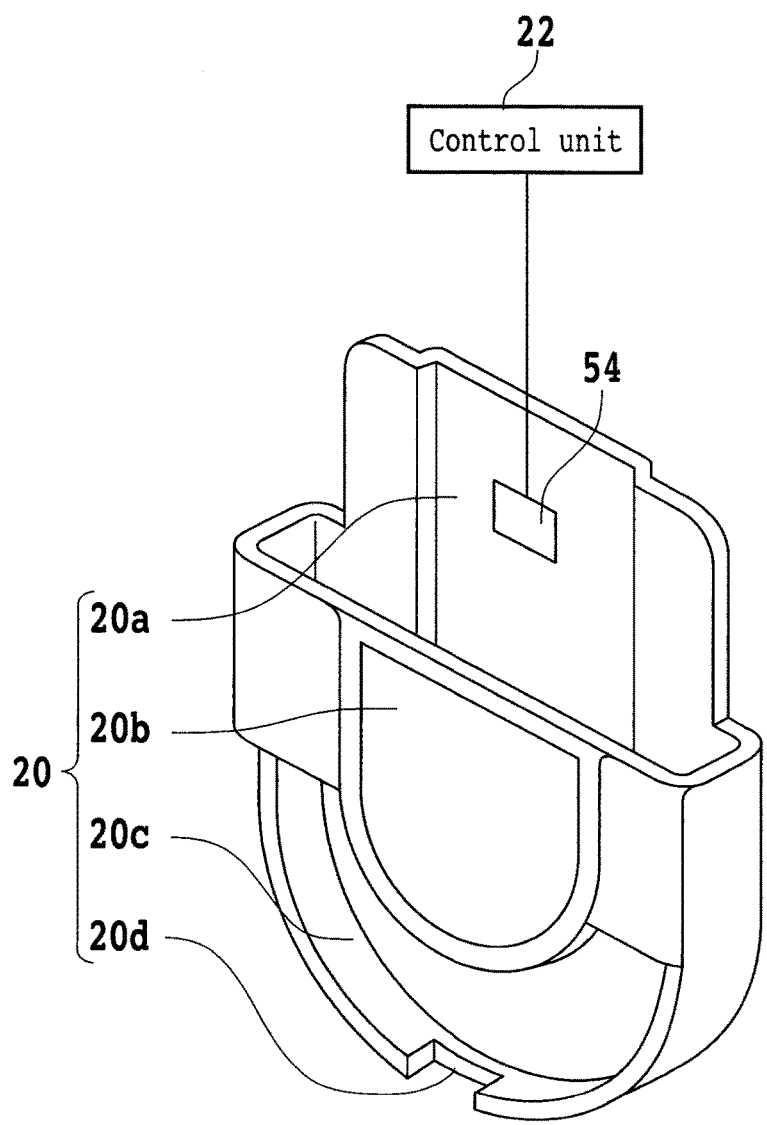
FIG. 5 is a schematic perspective view showing the configuration of a blade case holder.

FIG. 5 is a schematic perspective view showing the configuration of the blade case holder 20. In this preferred embodiment, the blade case holder 20 is used to hold the blade case 42 in its empty condition after mounting the cutting blade 8 to the flange 28. As shown in FIG. 5, the blade case holder 20 includes a holding portion 20b having a slit-like opening for insertion of the blade case 42. A support portion 20c is formed below the holding portion 20b to support the lower portion of the blade case 42 inserted through the slit-like opening of the holding portion 20b in the condition where the lug portion 50 is directed downward. The support portion 20c is formed with a cutout 20d for receiving the lug portion 50. The blade case holder 20 further includes a groove portion 20a for receiving a projecting portion 46a (see FIG. 4) formed on the outer surface of the lid portion 46. Accordingly, the blade case 42 is inserted through the slit-like opening of the holding portion 20b in the condition where the lug portion 50 is directed downward and the projecting portion 46a is slid along the groove portion 20a.

The groove portion 20a is provided with a reader/writer (read/write means) 54 for reading the use history information from the IC tag 52 provided on the blade case 42 and writing the use history information to the IC tag 52. The reader/writer 54 is located so as to be opposed to the IC tag 52 of the blade case 42 held in the blade case holder 20. The reader/writer 54 is connected to the control unit 22. The control unit 22 controls the reader/writer 54 so that the use history information of the cutting blade 8 read from the IC tag 52 is reflected in the processing conditions for the workpiece 11 to be processed. Further, the control unit 22 controls the reader/writer 54 so that the use history information of the cutting blade 8 after processing of the workpiece 11 is written to the IC tag 52. The reading and writing of the use history information are performed according to the instructions from an operator, for example. As a modification, automated control may be adopted so that the reading and writing of the use history information are performed with predetermined timing. The reader/writer 54 may include a minimum number of required components (e.g., antenna) for transmitting and receiving the use history information. In this case, other components are located outside the reader/writer 54.

There will now be described a managing method of managing the use history information of the cutting blade 8 in the cutting apparatus 2. For example, it is assumed that the cutting blade 8 was used in the cutting apparatus 2 in the past and this cutting blade 8 having such use history is now mounted on the cutting apparatus 2. In other words, any use history information has already been stored in the IC tag 52 of the blade case 42 storing this cutting blade 8. First, this cutting blade 8 is taken out of the blade case 42 and then mounted to the cutting unit 10. After mounting the cutting blade 8, the empty blade case 42 is held in the blade case holder 20. In this condition, the operator touches a "read" icon displayed on the monitor 18 to thereby instruct the control unit 22 on the reading of the use history information. As a result, the reader/writer 54 reads out the use history information stored in the IC tag 52 and transmits it to the control unit 22. Then, the control unit 22 reflects this use history information in the processing conditions for the workpiece 11 to be processed.

For example, the use history information includes any information such as "the attribute of the workpiece previously processed by the cutting blade 8," "the remaining edge amount of the cutting blade 8," "the worn edge amount of the cutting blade 8," "the life of the cutting blade 8," "the date and time of use of the cutting blade 8," "the number of hours of use of the cutting blade 8," "the apparatus on which the cutting blade 8 has been mounted," and "the circumstances about any trouble occurred in processing." In the case that "the remaining edge amount of the cutting blade 8" is included in the use history information, the control unit 22 adjusts the depth of cut by the cutting blade 8 to the workpiece 11 according to "the remaining edge amount of the cutting blade 8." Accordingly, the workpiece 11 can be suitably cut according to the remaining edge amount of the cutting blade 8.

When the cutting of the workpiece 11 is finished, the cutting blade 8 is demounted from the cutting unit 10. At this time, the operator touches a "write" icon displayed on the monitor 18 to thereby instruct the control unit 22 on the writing of the use history information. As a result, the control unit 22 sends the new use history information after cutting to the reader/writer 54. Then, the reader/writer 54 writes to the IC tag 52 the new use history information sent from the control unit 22. The cutting blade 8 demounted from the cutting unit 10 is stored into the blade case 42 with the IC tag 52 having the new use history information.

As described above, the cutting apparatus 2 according to this preferred embodiment includes the cutting unit (cutting means) 10 on which the cutting blade 8 is detachably mounted, the control unit (control means) 22 for controlling the cutting unit 10, and the blade case holder 20 for holding the blade case 42 for storing the cutting blade 8, wherein the control unit 22 is connected to the reader/writer (read/write means) 54 for reading the use history information of the cutting blade 8 from the IC tag 52 of the blade case 42 held in the blade case holder 20 and writing the use history information of the cutting blade 8 to the IC tag 52. Accordingly, the use history information of the cutting blade 8 read from the IC tag 52 by using the reader/writer 54 can be reflected in the processing conditions for the workpiece 11 to be processed. Further, the new use history information of the cutting blade 8 after processing of the workpiece 11 can be written to the IC tag 52 by using the reader/writer 54. As a result, the use history of the cutting blade 8 can be managed easily and suitably.

Figure 6:
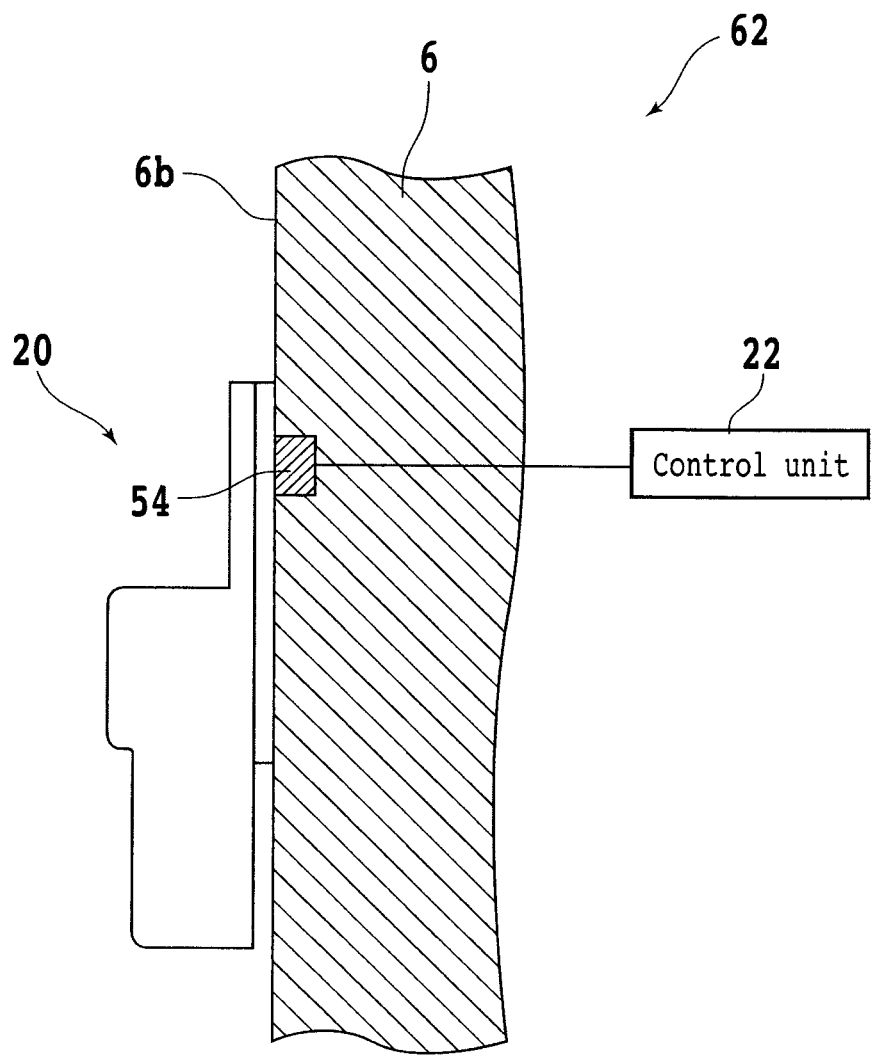
FIG. 6 is a schematic sectional view showing the structure of a blade case holder and its periphery in a cutting apparatus according to a modification of this preferred embodiment.

The present invention is not limited to the above preferred embodiment, but various modifications may be made. For example, while the reader/writer 54 is provided on the blade case holder 20 in the cutting apparatus 2 of the above preferred embodiment, the reader/writer 54 may be located at any position where the use history information of the cutting blade 8 can be transmitted and received between the reader/writer 54 and the IC tag 52. FIG. 6 is a schematic sectional view showing the structure of a blade case holder 20 and its periphery in a cutting apparatus 62 according to a modification of the above preferred embodiment. In the cutting apparatus 62 shown in FIG. 6, a reader/writer (read/write means) 54 is provided in the side surface 6b of the cover 6 to which the blade case holder 20 is fixed. The reader/writer 54 is located so as to be opposed to the blade case holder 20. Thus, also in the case that the reader/writer 54 is located in an area opposed to the blade case holder 20, the use history information can be suitably transmitted and received between the reader/writer 54 and the IC tag 52.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A cutting apparatus comprising:
    a chuck table for holding a workpiece;
    a cutting blade for cutting said workpiece held on said chuck table;
    cutting means on which said cutting blade is detachably mounted;
    control means for controlling said cutting means according to processing conditions set for processing of said workpiece; and
    a blade case holder separate from the cutting apparatus for holding a blade case for storing said cutting blade;
    said blade case being provided with an integrated circuit tag allowing reading and writing of use history information of said cutting blade;
    said cutting apparatus further comprising read/write means connected to said control means for reading the use history information of said cutting blade from said integrated circuit tag of said blade case held by said blade case holder and writing the use history information of said cutting blade to said integrated circuit tag,
    wherein the use history information of said cutting blade is read from said integrated circuit tag by said read/write means causing an adjustment in said processing conditions, and the use history information of said cutting blade after processing of said workpiece is written to said integrated circuit tag by said read/write means.

2. The cutting apparatus according to claim 1, wherein said read/write means is provided on said blade case holder.

3. The cutting apparatus according to claim 1, wherein said read/write means is provided in an area opposed to said blade case holder.

* * * * *